United States Patent
Palmer

(10) Patent No.: US 6,892,993 B2
(45) Date of Patent: May 17, 2005

(54) LOAD BEARING ARTICLE

(75) Inventor: Timothy A. Palmer, Moon Township, PA (US)

(73) Assignee: Lanxess Corporation, Pittsburgh, PA (US)

( * ) Notice: Subject to any disclaimer, the term of this patent is extended or adjusted under 35 U.S.C. 154(b) by 2 days.

(21) Appl. No.: 10/643,860

(22) Filed: Aug. 19, 2003

(65) Prior Publication Data

US 2005/0040307 A1 Feb. 24, 2005

(51) Int. Cl.$^7$ ............................................. A47B 91/00
(52) U.S. Cl. .............................. 248/346.02; 248/346.01
(58) Field of Search ...................... 248/346.01, 346.02, 248/346.4, 346.5; 108/57.26, 901, 166, 167, 108/171, 57.3; 206/386, 599

(56) References Cited

U.S. PATENT DOCUMENTS

| | | | |
|---|---|---|---|
| 3,349,924 A | * | 10/1967 | Maurer et al. ............. 211/41.1 |
| 3,986,462 A | * | 10/1976 | Heft ............................ 108/188 |
| 4,074,635 A | | 2/1978 | Stauble ........................ 108/27 |
| 4,319,792 A | | 3/1982 | Britt et al. .................. 312/245 |
| 4,467,927 A | * | 8/1984 | Nathan ........................ 211/153 |
| 4,690,360 A | * | 9/1987 | Looker .................. 248/346.02 |
| 4,838,176 A | * | 6/1989 | Bowser et al. ............. 108/53.3 |
| 4,843,975 A | | 7/1989 | Welsch et al. ................ 108/24 |
| 4,964,350 A | * | 10/1990 | Kolvites et al. ............ 108/110 |
| 5,188,246 A | | 2/1993 | Maxworthy .................. 211/153 |
| 5,190,803 A | | 3/1993 | Goldbach et al. ........... 428/138 |
| 5,718,441 A | * | 2/1998 | Kern et al. ................. 280/79.3 |
| 5,842,265 A | | 12/1998 | Rink ............................ 29/460 |
| 5,937,767 A | * | 8/1999 | Togawa et al. .......... 108/57.26 |
| 5,940,949 A | | 8/1999 | Rink .......................... 29/33 K |
| 6,050,428 A | * | 4/2000 | Hollander .................... 211/186 |
| 6,079,339 A | * | 6/2000 | Houk et al. ................. 108/186 |

(Continued)

Primary Examiner—Leslie A. Braun
Assistant Examiner—A. Joseph Wujciak
(74) Attorney, Agent, or Firm—Godfried R. Akorli; Jill Denesvich

(57) ABSTRACT

A load bearing article (1) is described and includes a plurality of elongated shells (20) having a plurality of internal reinforcing ribs (50) fixedly attached within the hollow interior (35) of each shell (20), the shells (20) reside substantially within a common plane and are fixedly attached together by means of an external molded plastic structure (53). Each elongated shell (20) has a plurality perforations (e.g., perforations 38, 41, 44 and 45) having edges. A portion of the plastic material of the internal reinforcing ribs (50) and the external molded structure (53) extends through at least some of the perforations in each shell (20), and the edges of the perforations are embedded in the plastic material extending therethrough, thereby fixedly attaching the internal reinforcing ribs (50) within and the external molded structure (53) to each shell (20). The load bearing surface (87) of the load bearing article (1) comprises (or is defined by at least) the external molded structure (53) (e.g., external molded structure (53) and at least one of, the elongated shells (20), and the plurality of internal reinforcing ribs (50)). The load bearing article is preferably formed by concurrently molding the plastic material of the plurality of internal reinforcing ribs (50) onto the interior surfaces (32), and the external molded structure (53) onto the exterior surfaces (29), of the elongated shells (20). Also described is a reversibly extendable load bearing structure (11) that includes at least two load bearing articles (1 and 1') connected together by means of a hinge (165).

30 Claims, 13 Drawing Sheets

U.S. PATENT DOCUMENTS

| | | | |
|---|---|---|---|
| 6,148,740 A * | 11/2000 | Jackel et al. | 108/57.32 |
| 6,401,944 B1 * | 6/2002 | Kircher et al. | 211/134 |
| 6,446,563 B1 | 9/2002 | Ohanesian | 108/57.25 |
| 6,488,347 B1 | 12/2002 | Bienick | 312/408 |
| 6,539,879 B1 * | 4/2003 | Current et al. | 108/42 |
| 6,659,019 B2 * | 12/2003 | Gruber et al. | 108/53.5 |

\* cited by examiner

LOAD BEARING ARTICLE

FIELD OF THE INVENTION

The present invention relates to a load bearing article (e.g., a shelf) that includes a plurality of elongated shells (e.g., fabricated from metal) which reside substantially within a common plane and that are fixedly attached together by means of an external molded plastic structure. Each elongated shell has a plurality of internal reinforcing plastic ribs within and fixedly attached to its hollow interior. The external molded structure and at least one of the elongated shells and the internal reinforcing plastic ribs together define a load bearing surface. The present invention also relates to a reversibly extendable load bearing structure that includes at least two load bearing articles that are connected together by means of hinges.

BACKGROUND OF THE INVENTION

Load bearing articles, such as shelves, are used in a number of applications, including for example transportation vehicles, such as delivery trucks and aircraft. Reducing the weight of the various components of transportation vehicles has been undertaken more recently in an effort to increase the fuel efficiency of such vehicles. The weight of a metal vehicle component can be reduced by fabricating the component from plastic. However, the plastic replacement components generally must possess strength and load bearing properties that are at least equivalent to those of the original metal components.

Some vehicle components are subjected to oscillating loads during operation of the vehicle. Plastic components, such as shelves, that have reduced weight relative to the original metal components, often fail catastrophically when subjected to oscillating loads. As such, to improve their oscillating load bearing properties, plastic components typically weigh at least as much as the metal components they have been designed to replace.

It would be desirable to develop load bearing articles that incorporate plastic materials and have reduced weight relative to equivalent metal components. In addition, it would be desirable that such newly developed load bearing articles possess strength, and static and oscillating load bearing properties that are at least equivalent to those of the original metal components that they are designed to replace.

SUMMARY OF THE INVENTION

In accordance with the present invention, there is provided a load bearing article comprising:

(a) a plurality of elongated shells residing substantially within a common plane, each of said elongated shells being separated one from the other and having exterior surfaces, interior surfaces which define a hollow interior, and a plurality of perforations having edges;

(b) a plurality of internal reinforcing ribs of plastic material located within the hollow interior of each elongated shell, a portion of said internal reinforcing ribs being in abutting relationship with the interior surfaces of each elongated shell;

(c) an external molded structure of plastic material residing between said elongated shells, a portion of said external molded structure being in abutting relationship with at least a portion of the exterior surfaces of said elongated shells; and (d) a load bearing surface comprising (or defined at least in part by) said external molded structure (e.g., said external molded structure and at least one of: said elongated shells; and said plurality of internal reinforcing ribs), wherein, (i) a portion of the plastic material of said internal reinforcing ribs extends through at least some of said perforations of each elongated shell, the edges of said perforations being embedded in the plastic material of said internal reinforcing ribs extending therethrough, thereby attaching fixedly said internal reinforcing ribs to each elongated shell, and (ii) a portion of the plastic material of said external molded structure extends through at least some of said perforations of said elongated shells, the edges of said perforations being embedded in the plastic material of said external molded plastic structure extending therethrough, thereby attaching fixedly said external molded plastic structure to said elongated shells and attaching fixedly said elongated shells to each other.

In further accordance with the present invention, there is also provided a reversibly extendable load bearing structure comprising at least two load bearing articles, each load bearing article being joined to at least one adjacent load bearing article by means of a hinge, each load bearing article having an end that abuts an end of each adjacent load bearing article when said reversibly extendable load bearing structure is fully extended, wherein each of said load bearing articles is as described above.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

Unless otherwise indicated, all numbers or expressions, such as those expressing structural dimensions, quantities of ingredients, etc. used in the specification and claims are understood as modified in all instances by the term "about."

BRIEF DESCRIPTION OF THE DRAWING FIGURES

FIG. 8 is a sectional representation of perforation edges of elongated shell 20 embedded in the plastic material of internal reinforcing ribs 50 extending there through;

FIG. 9 is a sectional representation of deformed perforation edges of elongated shell 20 embedded in the plastic material of internal reinforcing ribs 50 extending there through;

Figure 10:
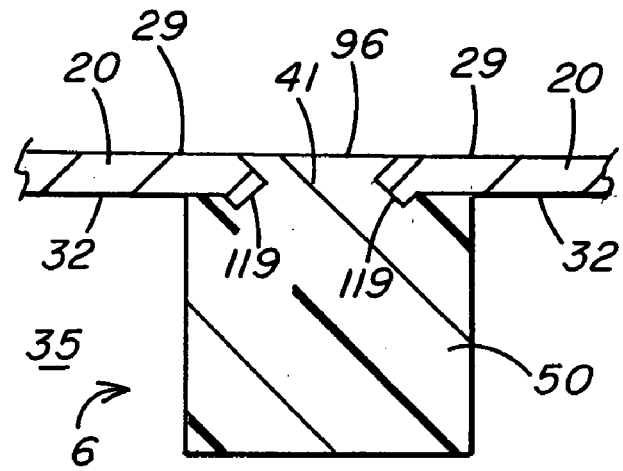
Figure 11:
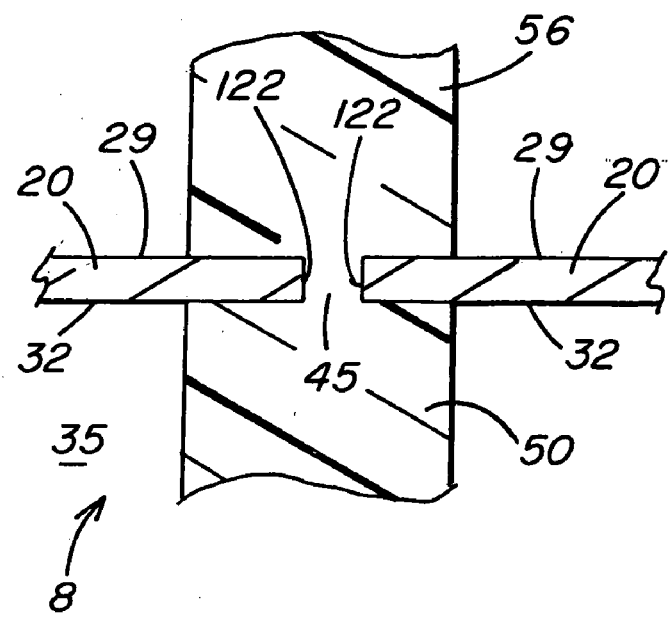
Figure 12:
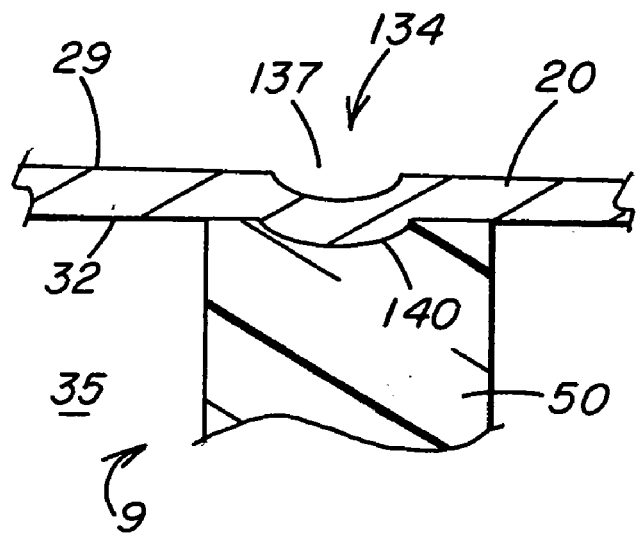
Figure 13:
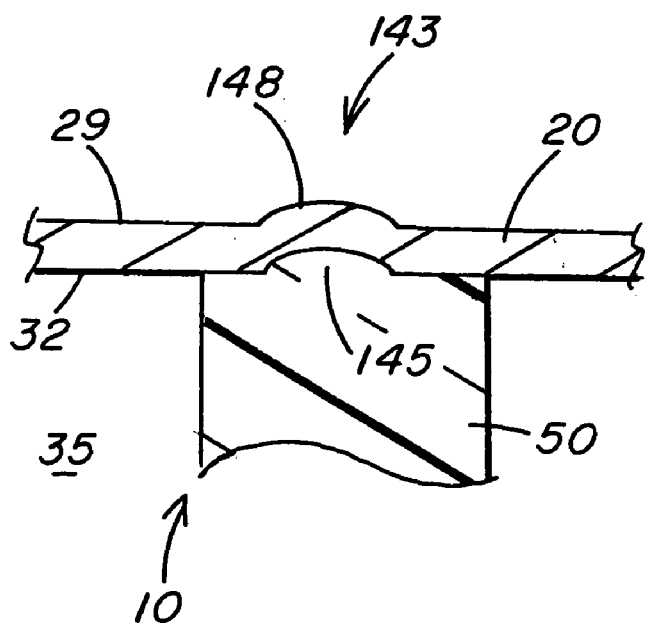
Figure 14:
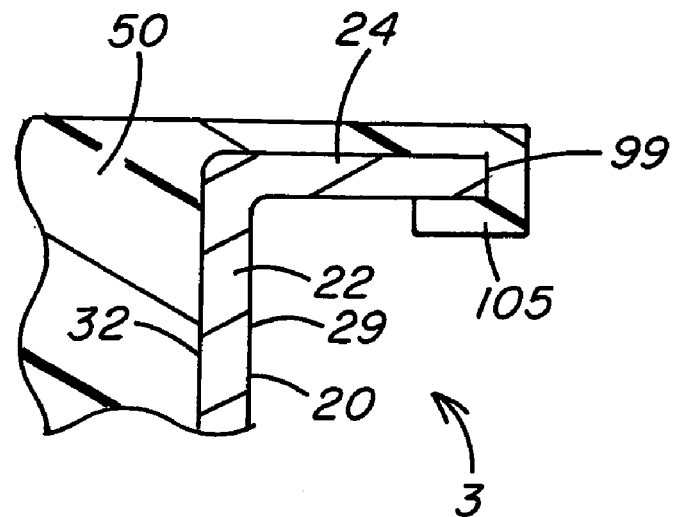
Figure 15:
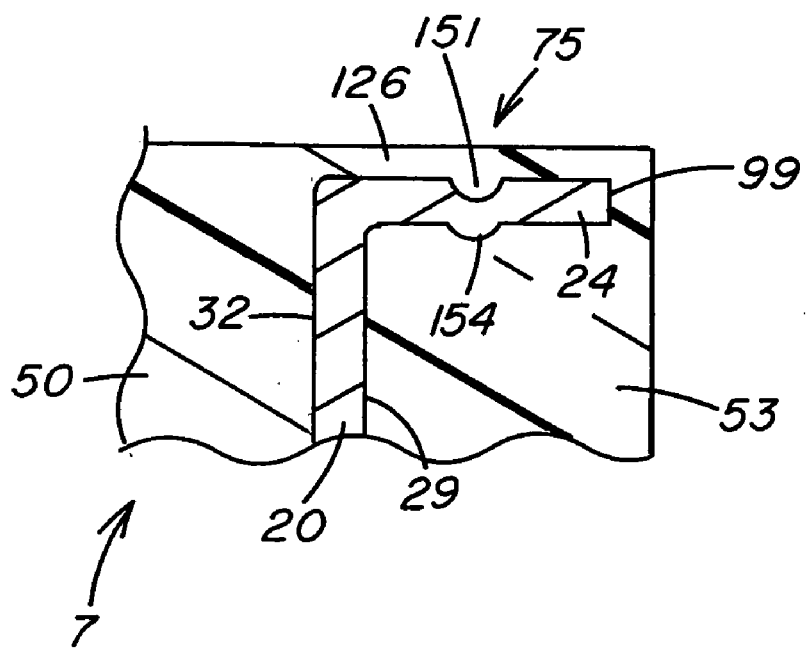
Figure 16:
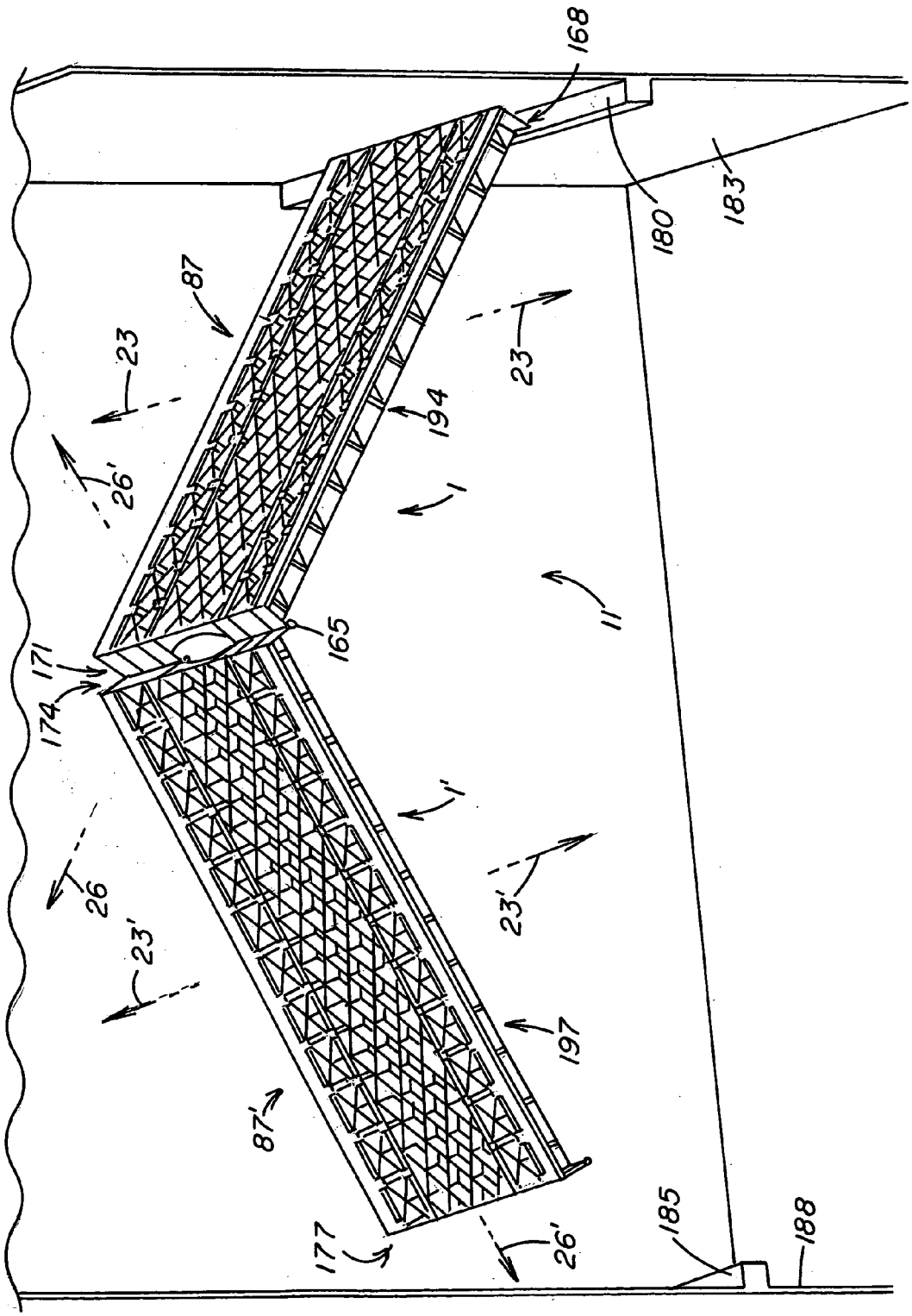
Figure 17:
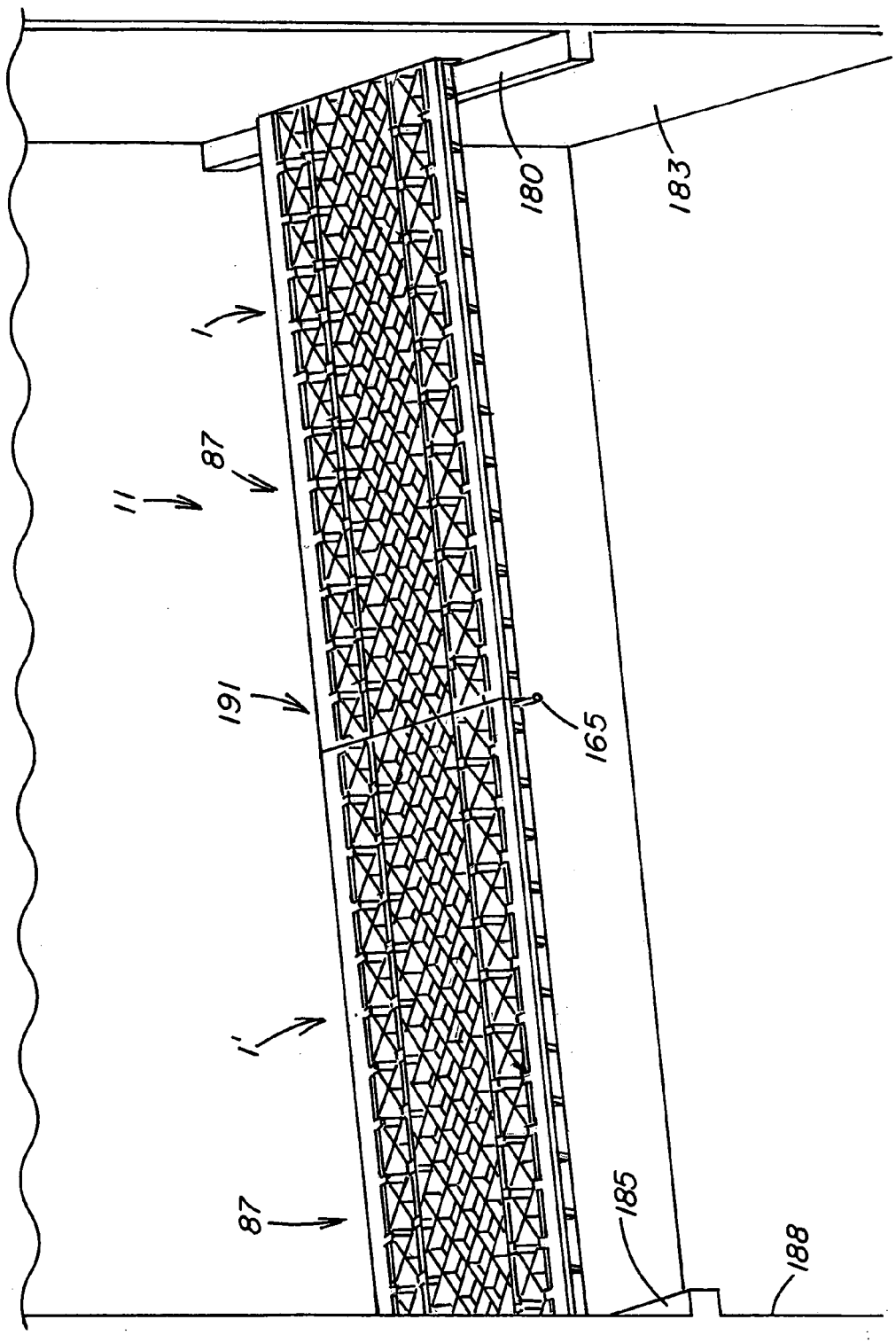

FIG. 10 is a sectional representation of deformed perforation edges of elongated shell 20 embedded in the plastic material of internal reinforcing ribs 50 extending therethrough, in which the plastic material extending through the perforation is substantially level with the exterior surface of elongated shell 20;

FIG. 11 is a sectional representation of perforation edges of elongated shell 20 embedded in the plastic material of internal reinforcing ribs 50 extending therethrough, which is continuous with the plastic material of external molded structure 53;

FIG. 12 is a sectional representation of a protrusion in elongated shell 20 that is embedded in the plastic material of internal reinforcing ribs 50;

FIG. 13 is a sectional representation of an indentation in elongated shell 20 that is embedded in the plastic material of internal reinforcing ribs 50;

FIG. 14 is a sectional representation of a terminal edge of elongated shell 20 that is embedded in the plastic material of internal reinforcing ribs 50 extending thereover;

FIG. 15 is a sectional representation of a terminal edge of elongated shell 20 that is embedded in the plastic material of external molded structure 53 extending there over, which plastic material is continuous with the plastic material of the internal reinforcing ribs 50;

FIG. 16 is a representative perspective view of a reversibly extendable load bearing structure according to the present invention, that is partially extended; and FIG. 17 is a representative perspective view of the reversibly extendable load bearing structure of FIG. 16, that is fully extended.

In FIGS. 1 through 17, like reference numerals designate the same components and structural features.

DETAILED DESCRIPTION OF THE INVENTION

Figure 1:
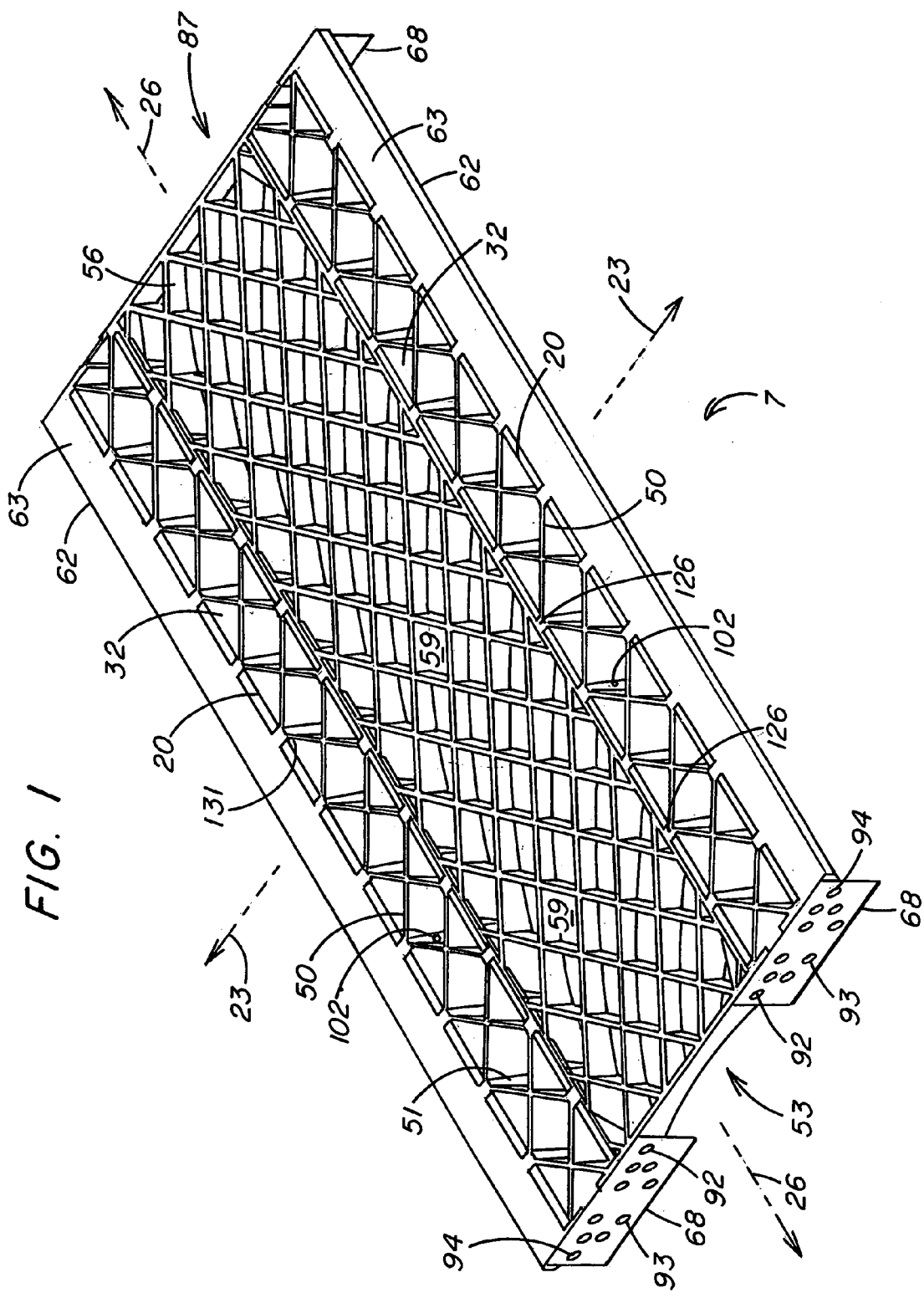
FIG. 1 is a representative perspective view from above a load bearing article according to the present invention, in which the load bearing surface thereof has a plurality of apertures.
Figure 2:
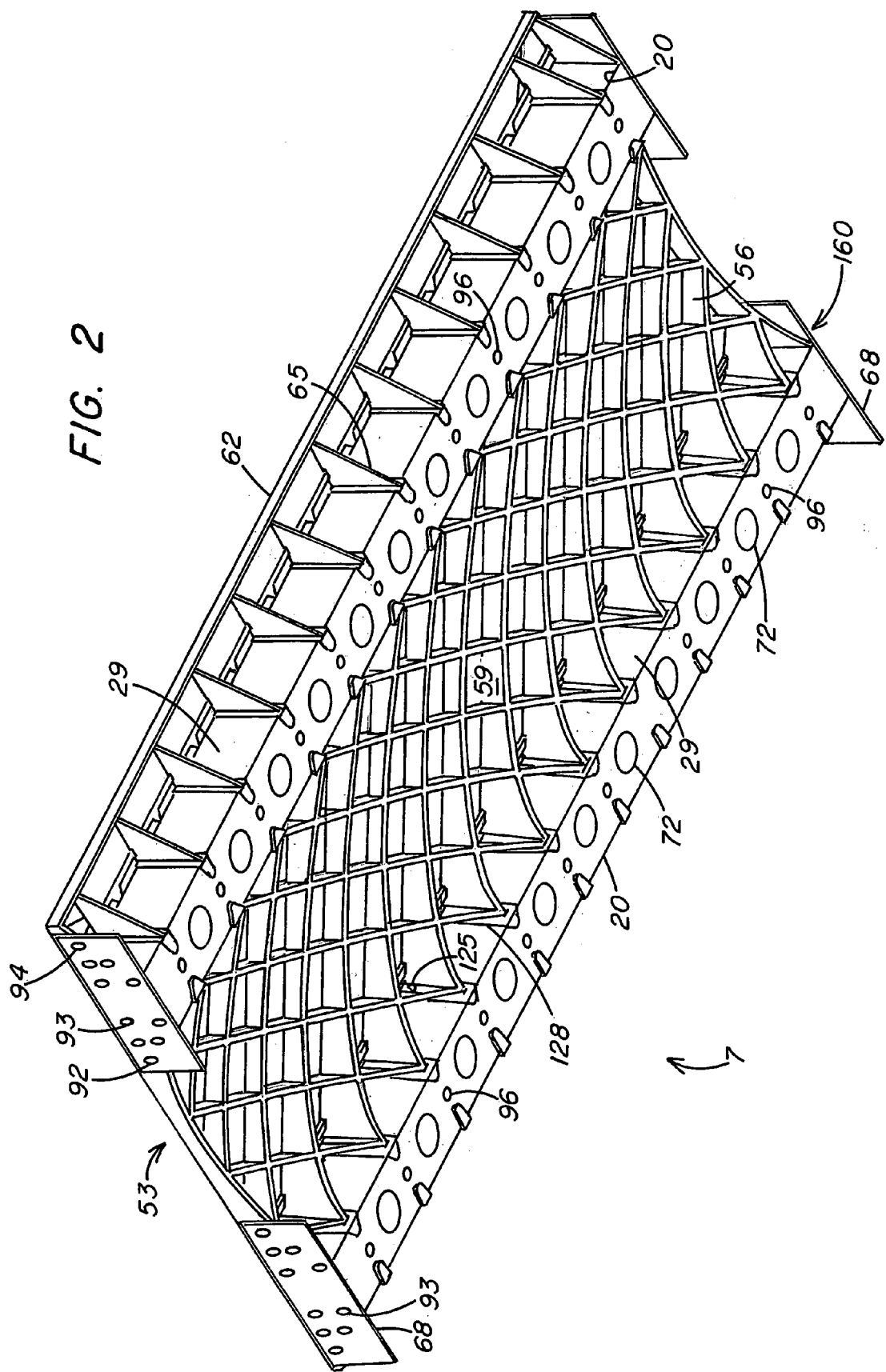
FIG. 2 is a representative perspective view of the underside of the load bearing article of FIG. 1.

Referring now to FIGS. 1 and 2 of the drawings, there is shown a load bearing article 1 according to the present invention, which includes two elongated shells 20 each having a plurality of internal reinforcing ribs 50 therein, and an external molded structure 53 residing between shells 20. Each elongated shell 20 resides substantially within a common plane defined by the longitudinal axis 26 and the latitudinal axis 23 of load bearing article 1. The elongated shells 20 are separated from each other (i.e., each elongated shell does not abut another elongated shell).

The load bearing articles of the present invention may include more than two elongated shells, e.g., 3, 4, 5, 6, 7, 8, 9, 10 or more shells. The elongated shells may have any number of orientations relative to each other, e.g., parallel, angular, such as perpendicular and triangular, and combinations thereof. Elongated shells 20 of load bearing article 1 are oriented substantially parallel with each other. In an embodiment of the present invention, article 1 may include at least one additional elongated shell (not shown) that is positioned between and oriented substantially perpendicular to each of shells 20. In an embodiment of the present invention, the load bearing article includes four elongated shells (not shown) that substantially define the periphery of the article, e.g., being oriented in the form of a square or rectangle.

While elongated shells 20 are depicted as being elongated substantially linear shells, they may also be selected in addition to or alternatively from elongated arched shells, e.g., elongated semi-circular shells or elongated semi-parabolic shells. Elongated shell 20 may have any suitable shape (cross sectional shape), for example, selected from U-shapes and C-shapes (each having an open top), circular shapes, elliptical shapes, and polygonal shapes (e.g., square, rectangular, pentagonal and hexagonal shapes). In a preferred embodiment of the present invention, the elongated shell is a substantially U-shaped elongated shell, e.g., shell 20.

Figure 5:
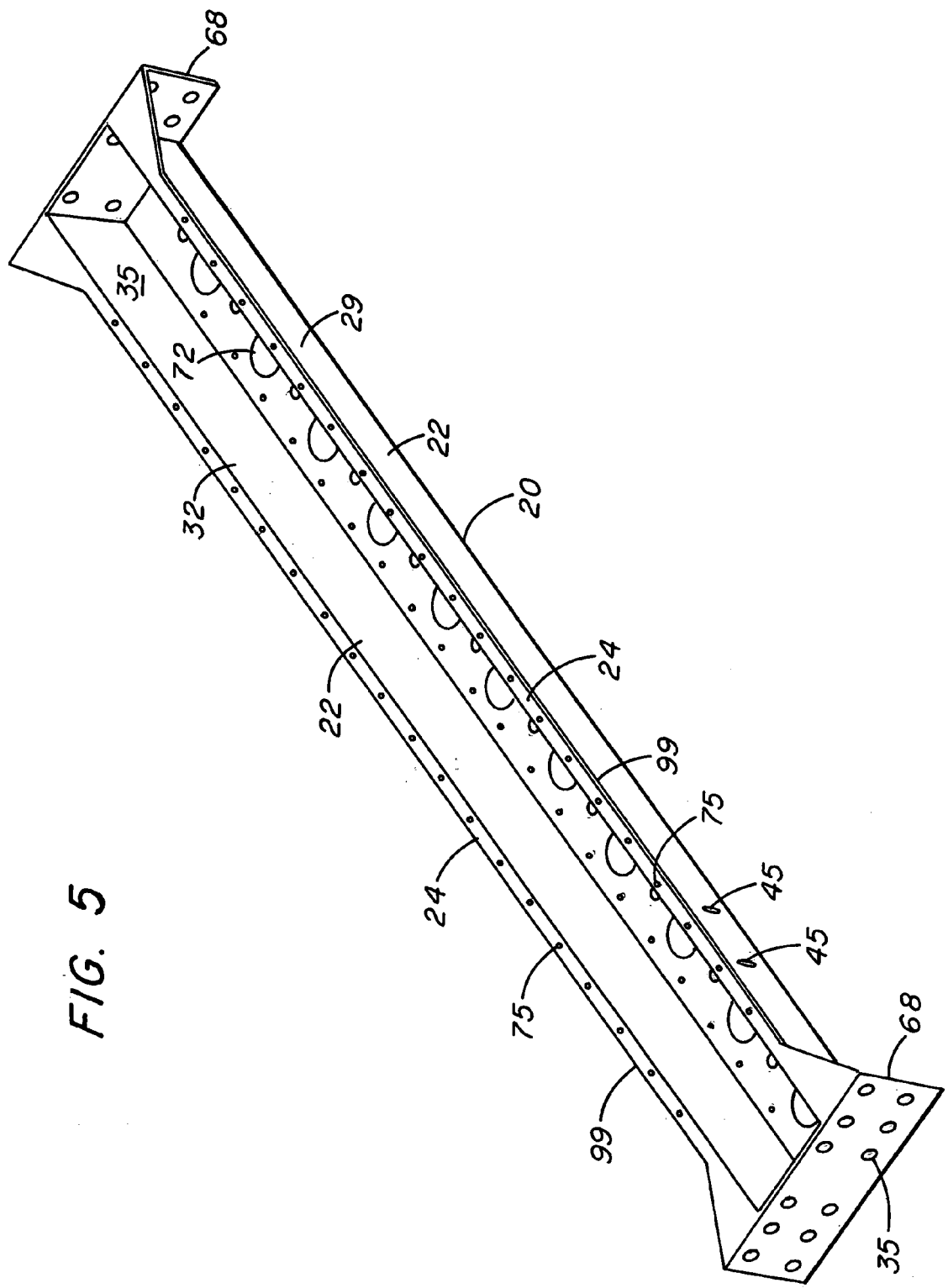
FIG. 5 is a representative perspective view of an elongated U-shaped shell that may be used in the load bearing article of the present invention.
Figure 6:
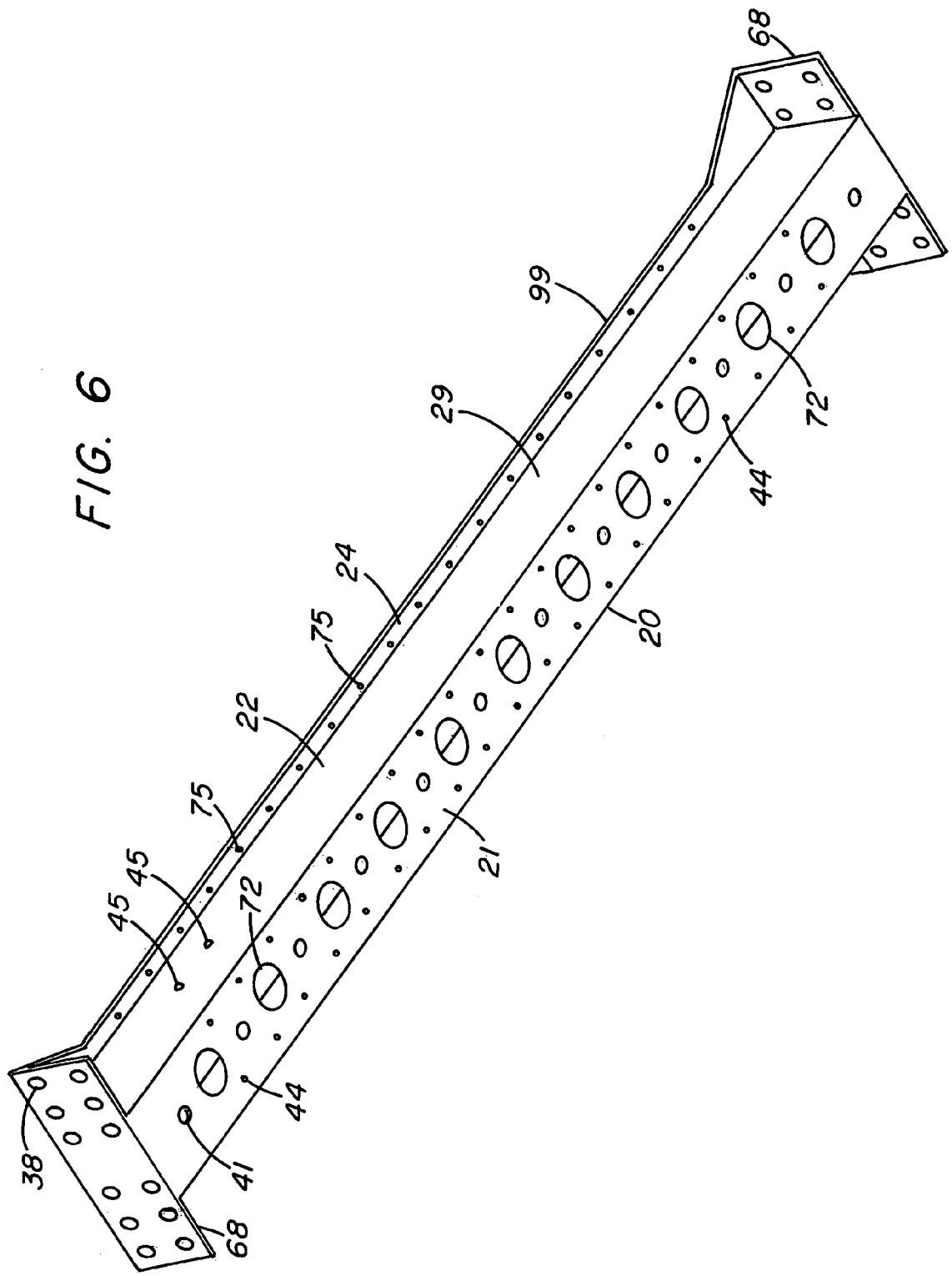
FIG. 6 is a further representative perspective view of the elongated U-shaped shell of FIG. 5, which has been rotated about its longitudinal axis.
Figure 7:
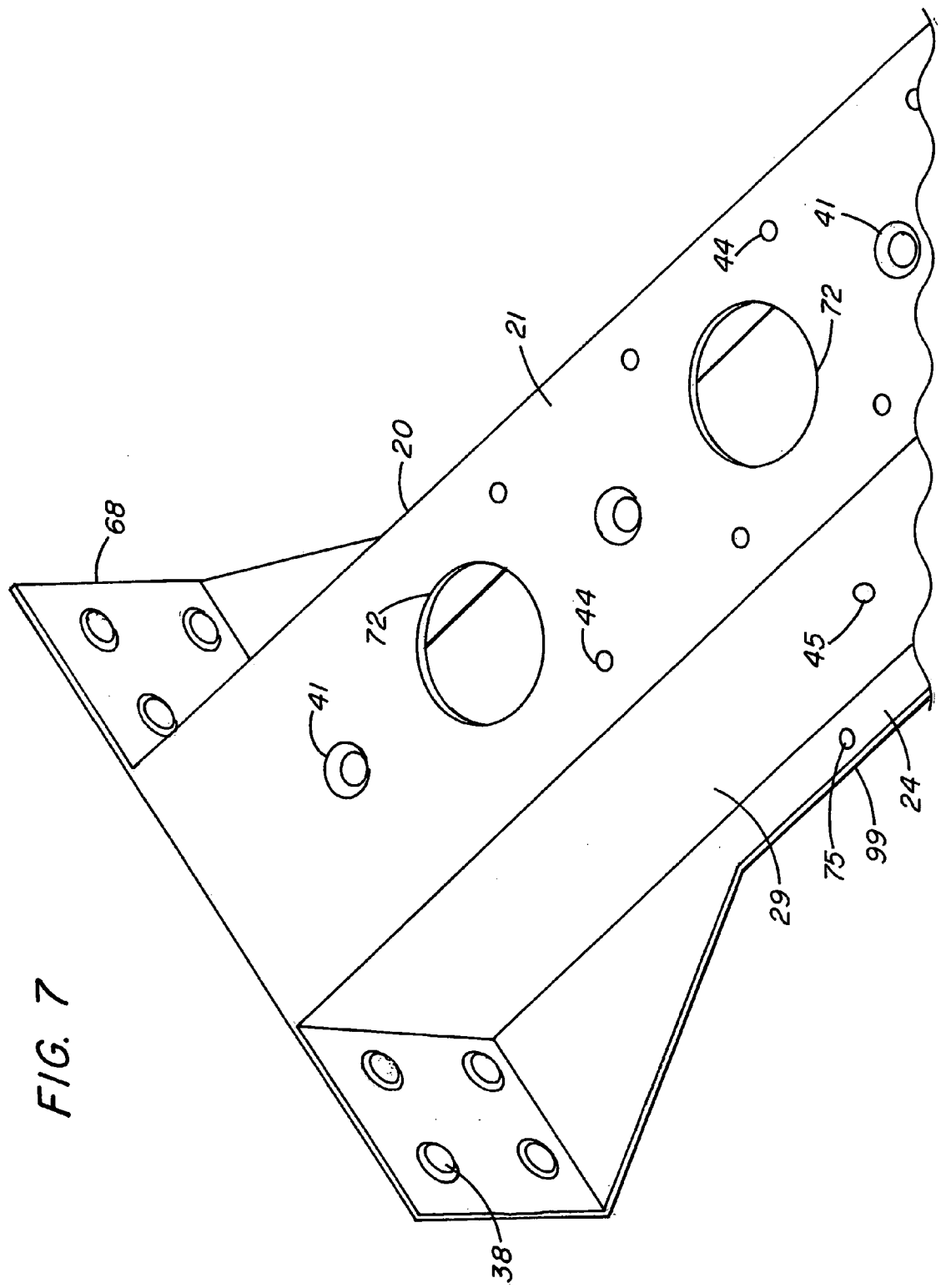
FIG. 7 is a magnified perspective view of a portion of the elongated U-shaped shell of FIG. 5.

Elongated shells 20 may be described more particularly with reference to FIGS. 5–7. Elongated shells 20 each have exterior surfaces 29 and interior surfaces 32. Interior surfaces 32 of elongated shell 20 define a hollow interior 35 therein (see FIG. 5). More particularly, elongated shell 20 has a base 21, and sidewalls 22 extending upward from base 21 (or downward from base 21 if rotated 180° around the longitudinal axis of shell 20). It is the interior surfaces 32 of base 21 and sidewalls 22 that together define hollow interior 35 of shell 20. A flange 24 extends outward from the upper portion of each of sidewalls 21. As shell 20 is substantially U-shaped, the upper portion thereof (or lower portion if rotated 180° around its longitudinal axis) is open. Each longitudinal end of elongated shell 20 has an end-plate 68. Optionally, at least one of the longitudinal ends of shell 20 may be open (not shown).

Each elongated shell 20 also includes a plurality of perforations, for purposes of fixedly attaching internal reinforcing ribs 50 within and external molded structure 53 to shells 20 (as will be discussed further herein). End-plates 68 of shell 20 have perforations 38 that are defined by deformed edge portions (as will be described in further detail herein). Shell 20 also includes perforations 44 and 45 (that do not have deformed edge portions), and perforations 41 that are defined by deformed edge portions (see FIG. 7). For purposes of reducing weight, the elongated shells may optionally include apertures that are larger than the perforations. Base 21 of elongated shell 20 has apertures 72 therein, which serve to reduce the weight of the shell without compromising its structural integrity.

Each elongated shell 20 may independently be fabricated from a material selected from metal, thermoset plastic material, thermoplastic material and combinations thereof. Preferably, each elongated shell 20 is fabricated from metal. Metals from which each shell 20 may independently be fabricated include, but are not limited to, ferrous alloys, aluminum alloys and titanium alloys. When fabricated from metal, at least a portion of the surface of the elongated shells may be covered with a layer of molded-on plastic (thermoset and/or thermoplastic) material (not shown).

As used herein and in the claims the term "thermoset plastic material" means plastic materials having a three dimensional crosslinked network resulting from the formation of covalent bonds between chemically reactive groups, e.g., active hydrogen groups and free isocyanate groups or oxirane groups. Thermoset plastic materials from which the elongated shells may be fabricated include those known to the skilled artisan, e.g., crosslinked polyurethanes, crosslinked polyepoxides and crosslinked polyesters. Of the thermoset plastic materials, crosslinked polyurethanes are preferred. For purposes of illustration, shell 20 may be fabricated from crosslinked polyurethanes by the art-recognized process of reaction injection molding. Reaction injection molding typically involves, as is known to the skilled artisan, injecting separately, and preferably simultaneously, into a mold: (i) an active hydrogen functional component (e.g., a polyol and/or polyamine); and (ii) a functional component that forms covalent bonds with the active hydrogen functional component, such as an isocyanate functional component (e.g., a diisocyanate such as toluene diisocyanate, and/or dimers and trimers of a diisocyanate such as toluene diisocyanate). The filled mold may optionally be heated to ensure and/or hasten complete reaction of the injected components. Upon complete reaction of the injected components, the mold is opened and the molded article, e.g., shell 20, is removed.

As used herein and in the claims, the term "thermoplastic material" means a plastic material that has a softening or melting point, and is substantially free of a three dimensional crosslinked network resulting from the formation of covalent bonds between chemically reactive groups, e.g., active hydrogen groups and free isocyanate groups. Examples of thermoplastic materials from which each shell 20 may be fabricated include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and mixtures or thermoplastic compositions containing one or more thereof. Of the thermoplastic materials from which each shell 20 may be fabricated, thermoplastic polyamides are preferred. Shells 20 may be fabricated from thermoplastic materials by the art-recognized process of injection molding, in which a molten stream of thermoplastic material, e.g., molten thermoplastic polyamide, is injected into a mold, e.g., an optionally heated mold. Upon cooling the filled mold, the molded article, e.g., shell 20, is removed. A preferred thermoplastic material from which each shell 20 may be fabricated is thermoplastic polyamide, e.g., DURETHAN thermoplastic polyamide, commercially available from Bayer Polymers LLC.

The thermoset plastic materials and/or thermoplastic materials from which each shell 20 may be fabricated, may optionally be reinforced with a material selected from glass fibers, glass beads, carbon fibers, metal flakes, polyamide fibers, nanoparticulate materials (e.g., having average particle sizes in the range of from 1 nm to 1000 nm, such as nanoparticulate clays), talc and mixtures thereof. The reinforcing fibers, and the glass fibers in particular, may have sizings on their surfaces to improve miscibility and/or adhesion to the plastics into which they are incorporated, as is known to the skilled artisan. Glass fibers are a preferred reinforcing material in the present invention. If used, the reinforcement material, e.g., glass fibers, is typically present in the thermoset plastic materials and/or thermoplastic materials of each shell 20 in a reinforcing amount, e.g., in an amount of from 5 percent by weight to 60 percent by weight, based on the total weight of each shell 20.

Load bearing article 1 also includes a plurality of internal reinforcing ribs 50 of plastic material, that are located within hollow interior 35 of each elongated shell 20. A portion (e.g., abutting portion 51, FIG. 1) of internal reinforcing ribs 50 abuts interior surfaces 32 of shell 20. Internal reinforcing ribs 50 are separate from and are not continuous with elongated shell 20. The plurality of internal reinforcing ribs may be separate from each other. Preferably, the plurality of internal reinforcing ribs 50 form a substantially continuous unitary structure of reinforcing ribs within hollow interior 35 of each elongated shell 20 (as depicted in drawing FIGS. 1–4).

The internal reinforcing ribs may have configurations selected from, for example, arched configurations, box-like configurations, diamond-like configurations and combinations thereof. The internal reinforcing ribs typically have a diamond-like configuration, as depicted in FIGS. 1 and 2, in which two opposing points of each diamond-like configuration are substantially aligned with, and the other two opposing points thereof are substantially perpendicular to, the longitudinal axis of elongated shell 20.

Internal reinforcing ribs 50 are fixedly (and irreversibly) attached to each elongated shell 20 by means of plastic material of the ribs extending through at least some of the perforations (e.g., 38, 41, 44 and 45) of shell 20. The edges of the perforations of shell 20 are embedded in the plastic material of ribs 50 extending therethrough.

Internal reinforcing ribs 50 may be molded separately from shell 20, and include plastic extensions (not shown). The plastic extensions can be in the form of plastic rods of uniform diameter, or snap fittings having a shaft and a head which is typically rounded and of larger diameter than the shaft. Ribs 50 are then inserted within hollow interior 35 of shell 20 such that the plastic extensions extend through at least some of the perforations in shell 20. When the plastic extensions are in the form of plastic rods, the portions thereof extending through and beyond the perforations may be modified to form attachment heads (e.g., attachment heads 92, 93, 94 and 96, FIGS. 1 and 2) by means of the application of heat and/or radio frequencies thereto: The application of heat and/or radio frequencies also serves to soften the shaft of the rod causing the edges of the perforations to become embedded in the plastic material of the rod extending therethrough. When the plastic extensions are in the form of snap fittings, the heads of the snap fittings are pressed through the perforations in shell 20 and form the attachment heads, while the edges of the perforations clinch the shaft of the snap fitting. The optional and subsequent application of heat and/or radio frequencies to the snap fitting serves to soften the shaft of the snap fitting causing the edges of the perforations to become embedded in the plastic material of the shaft extending therethrough.

With the load bearing article of the present invention, a plastic element (e.g., internal reinforcing ribs 50) is fixedly and irreversibly attached to shell 20 by means of perforation edges of shell 20 being embedded in the plastic material of the element extending therethrough. The perforation edges do not merely abut the plastic material extending therethrough, but rather are embedded in the plastic material extending therethrough.

In a preferred embodiment of the present invention, internal reinforcing ribs 50 are formed by means of molding the plastic material of the ribs onto the interior surfaces 32 of elongated shell 20. Typically, shell 20 is placed within a mold (not shown), and a separate internal mold structure (not shown), which serves to define ribs 50, is inserted within hollow interior 35 of shell 20. Plastic material is injected (in the case of thermoplastic materials) or reaction injected (in the case of thermosetting plastic materials) into the internal mold structure to form ribs 50. During the molding operation, a portion of the plastic material of internal reinforcing ribs 50 passes or extends through at least some of the perforations in shell 20. The edges of the perforations are embedded in the molded on plastic material of the ribs that extends therethrough. Attachment heads (as will be discussed further herein) that are continuous with the plastic material extending through the perforations, may be formed by means of indentations (not shown) in the mold that are aligned with the perforations, and into which the molded on plastic material of ribs 50 extends.

Means of fixedly attaching ribs 50 to shell 20 will be described with reference to FIGS. 8–10. The plastic material of reinforcing ribs that extends through the perforations in shell 20 also typically forms an attachment head on external surface 29 side of shell 20. The combination of the perforations edges being embedded in the plastic material of ribs 50 extending therethrough and the attachment heads serves to fixedly attach ribs 50 within hollow interior 35 of shell 20. The attachment heads may be substantially flush with exterior surface 29 of shell (e.g., attachment head 96 of FIG. 10). Alternatively, the attachment heads may extend out and over exterior surfaces 29 of shell 20 (e.g., attachment head 105 in FIGS. 8 and 9).

Figure 8:
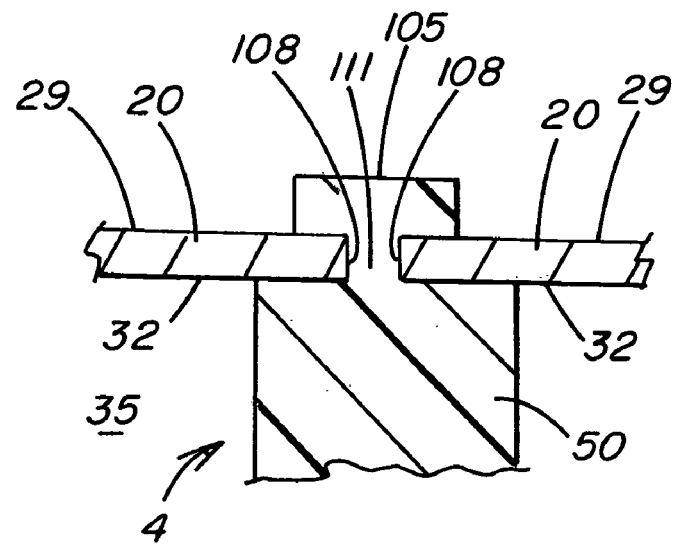

An attachment means 4 is depicted in FIG. 8, in which a portion of rib 50 abuts internal surface 32 of shell 20. Perforation 111 is defined by non-deformed edge portions 108, which are embedded in the plastic material of rib 50 that extends therethrough. The plastic material of rib 50 extending through perforation 111 is continuous with plastic attachment head 105 which abuts exterior surface 29 of shell 20. Attachment head 105 may be formed, for example, by means of an indentation in the inner wall of the mold (not shown) that is aligned with perforation 111. During molding of the plastic material of rib 50 onto internal surface 32 of shell 20, plastic material flows through perforation 111 and into the aligned mold wall indentation to form attachment head 105. The combination of attachment head 105 and edges 108 of perforation 111 being embedded in the plastic material of rib 50 serves to fixedly attach rib 50 to shell 20.

Figure 9:
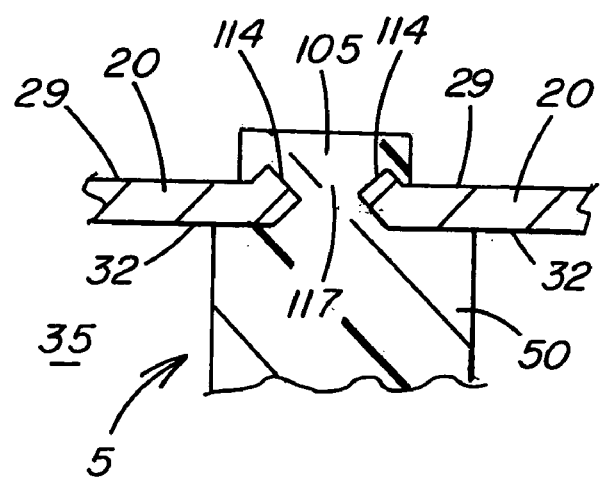

Attachment means 5 of FIG. 9 is similar to that of attachment means 4 of FIG. 8, but includes a perforation 117 that is defined by deformed edge portions 114. Deformed edge portions 114 are embedded in the plastic material of rib 50 extending through perforation 117. In addition, deformed edge portions 114 extend partially up into attachment head 105.

Attachment means 6 of FIG. 10 includes an attachment head 96 (see also FIG. 2) that is substantially flush (or aligned) with exterior surface 29 of shell 20. Perforation 41 (see also FIGS. 6 and 7) is defined by deformed edge portions 119, which are embedded in the plastic material of rib 50 extending therethrough. The plastic material of rib 50 extending through perforation 41 forms and is continuous with attachment head 96. When ribs 50 are formed by molding plastic material onto interior surfaces 32 of shell 20, flush attachment head 96 may be formed by the plastic material of rib 50 passing through perforation 41 and up against the interior wall of the mold (not shown) which abuts exterior surface 29 of shell 20.

Optionally, internal reinforcing ribs 50 may be further fixedly attached to elongated shell 20 by means of fasteners (e.g., fastener 102 in FIG. 1) and/or adhesives (e.g., adhesive 131 in FIG. 1) interposed between ribs 50 and interior surfaces 32 of shell 20. Adhesives that may be used include those known to the skilled artisan, such as thermoplastic adhesives and thermosetting adhesives. Typically, an adhesive is applied to portions of interior surface 32 of shell 20 prior to either inserting ribs 50 into hollow interior 35, or molding the plastic material of ribs 50 onto interior surfaces 32 of shell 20.

In an embodiment of the present invention, internal reinforcing ribs 50 are further fixedly attached to shell 20 by means of terminal edges of shell 20 (e.g., terminal edges 99 of flange 24) being embedded in the plastic material of the reinforcing ribs. As used herein and in the claims, the term "terminal edges" refers to the edges of shell 20 (e.g., terminal edges 99 of flange 24), and is not inclusive of the edges that define the perforations of shell 20. Such a wrap-around attachment means 3 is depicted in FIG. 14, wherein a portion of the plastic material 105 of internal reinforcing rib 50 extends out over flange 24 and wraps around and embeds terminal edge 99 therein.

Wrap-around attachment means 3 may be formed, for example, by means of snapping wrap-around extensions over terminal edges 99 when internal reinforcing ribs 50 are inserted into hollow interior 35 of shell 20. Preferably, wrap-around attachment means 3 is formed by molding of plastic material onto flange 24 and terminal edges 99 concurrently with the molding of the plastic material of ribs 50 onto interior surfaces 32 of shell 20.

Load bearing article 1 also includes an external molded structure 53 of plastic material that resides between elongated shells 20. A portion of structure 53 abuts a portion of exterior surfaces 29 of shell 20. External molded structure 53 is separate from and is not continuous with elongated shells 20. External molded structure 53 fixedly attaches shells 20 together. The external molded structure may comprise a plurality of separate components. Preferably, external molded structure 53 is a continuous unitary structure between elongated shells 20.

The external molded structure may be a substantially solid plastic structure. Preferably the external molded structure includes a plurality of plastic reinforcing ribs (e.g., ribs 56 in FIGS. 1 and 2, and ribs 81 in FIG. 4).

The plastic ribs of the external molded structure may have configurations selected from, for example, arched configurations, box-like configurations, diamond-like configurations and combinations thereof. Ribs 56 of external molded structure 53 have a diamond-like configuration in which two opposing points of each diamond-like configuration are substantially aligned with, and the other two opposing points thereof are substantially perpendicular to, the longitudinal axis 26 of article 1. External molded structure 78 of load bearing article 2 of FIG. 4 includes plastic ribs 81, which are oriented substantially perpendicular to longitudinal axis 88, and substantially parallel to latitudinal axis 90 of article 2.

Figure 3:
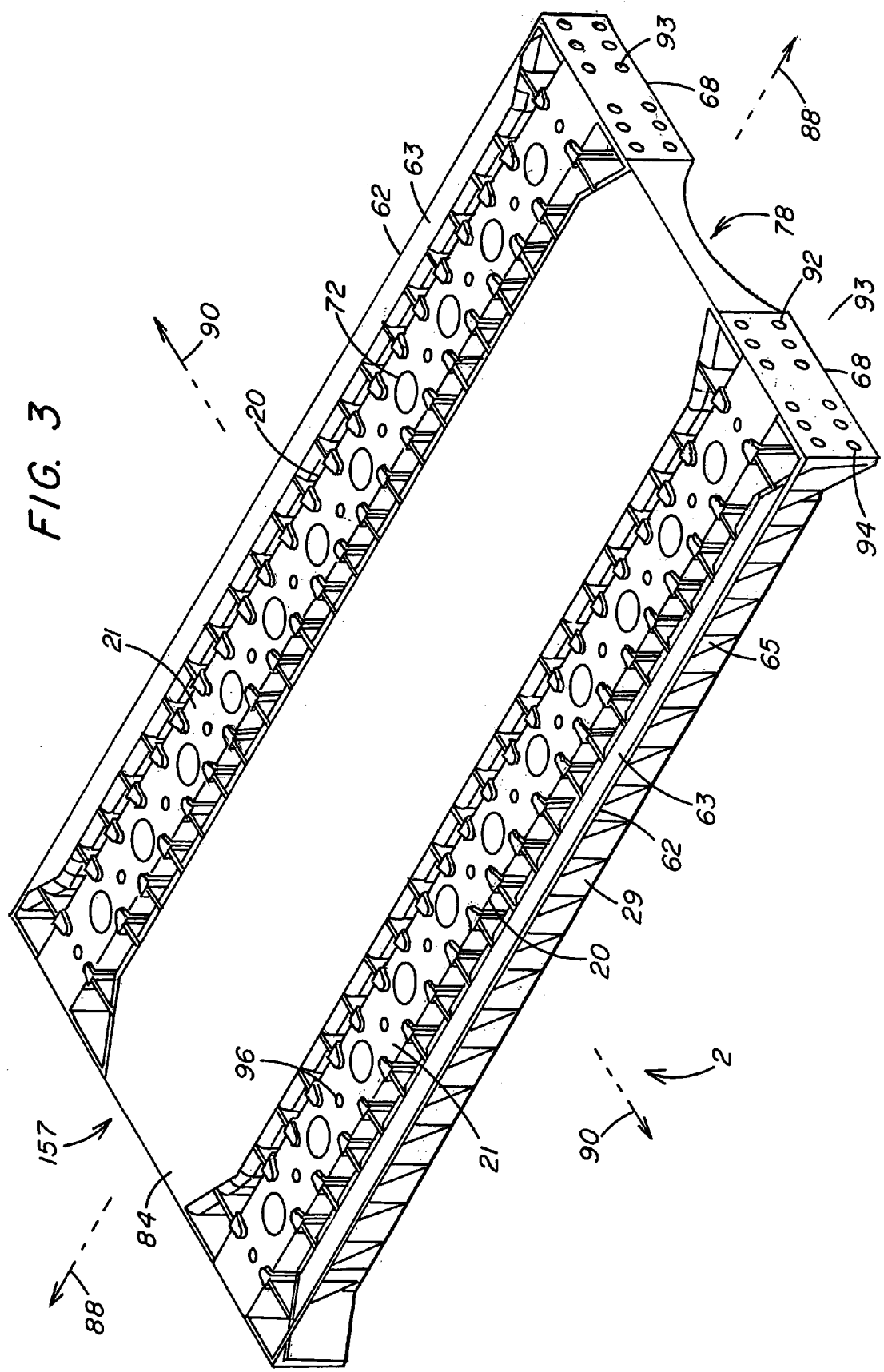
FIG. 3 is a representative perspective view from above a load bearing article according to the present invention, in which the load bearing surface thereof is substantially closed.
Figure 4:
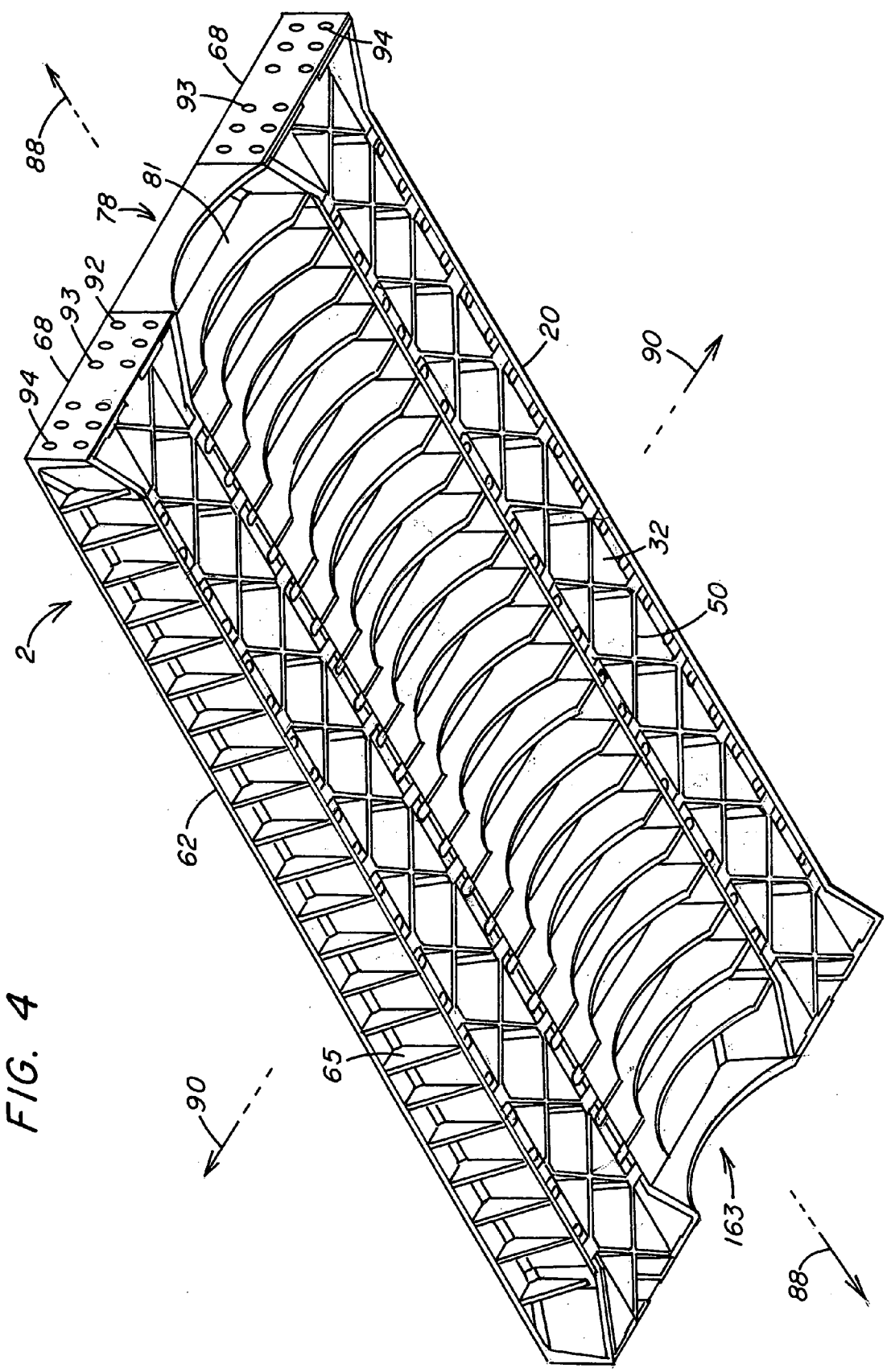
FIG. 4 is a representative perspective view of the underside of the load bearing article of FIG. 3.

Ribs 56 define apertures 59 in external molded structure 53 (FIGS. 1 and 2). Alternatively, as depicted in FIGS. 3 and 4, external molded structure 78 has a substantially closed surface 84.

External molded structures 53 and 78 of FIGS. 1–4 are each fixedly (and irreversibly) attached to elongated shells 20 by means of plastic material of the external molded structure extending through at least some of the perforations (e.g., perforations 38, 44 and 45) of shell 20. The edges of shell 20 are embedded in the plastic material of external molded structures 53 and 78 extending therethrough.

With reference to FIGS. 1 and 2, external molded structure 53 may be molded separately from shell 20, and may also include plastic extensions (not shown). The plastic extensions can be in the form of plastic rods of uniform diameter, or snap fittings having a shaft and a head which is typically rounded and of larger diameter than the shaft. External molded structure 53 and shells 20 are then brought together, such that a portion of structure 53 abuts exterior surface 29 of shell 20 and the plastic extensions extend through at least some of the perforations of shell 20. When the plastic extensions are in the form of plastic rods, the portions thereof extending through and beyond the perforations (into hollow interior 35) may be modified to form attachment heads (not shown) by means of the application of heat and/or radio frequencies thereto. The application of heat and/or radio frequencies also serves to soften the shaft of the rod causing the edges of the perforations to become embedded in the plastic material of the rod extending therethrough. When the plastic extensions are in the form of snap fittings, the heads of the snap fittings are pressed through the perforations in shell 20 and form the attachment heads, while the edges of the perforations clinch the shaft of the snap fitting. The optional and subsequent application of heat and/or radio frequencies to the snap fitting serves to soften the shaft of the snap fitting causing the edges of the perforations to become embedded in the plastic material of the shaft extending therethrough.

In a preferred embodiment of the present invention, external molded structure 53 is formed by means of molding plastic material onto exterior surfaces 29 of elongated shells 20. Typically, shells 20 are placed within a mold (not shown), and a separate internal mold structure (not shown), which serves to define external molded structure 53, is inserted into the mold between both of shells 20. Plastic material is injected (in the case of thermoplastic materials) or reaction injected (in the case of thermosetting plastic materials) into the internal mold structure to form structure 53. During the molding operation, a portion of the plastic material of external molded structure 53 passes or extends through at least some of the perforations in shell 20. The edges of the perforations are embedded in the molded on plastic material of structure 53 that extends therethrough.

Attachment heads (similar to those depicted in FIGS. 8–10) that are continuous with the plastic material of structure 53 extending through the perforations, may be formed by means of reversible slides (not shown) that abut interior surfaces 32 over the perforations of shells 20. The reversible slides may include indentations that serve to define the attachment heads. The molded on plastic material of external molded structure 53 flows up against the reversible slides or into the indentations of the reversible slides and thus forms the attachment heads. The molded on plastic of external molded structures 53 and 78 may also flow through some of perforations 38 of end plates 68 of shells 20 to form attachment heads 92.

As discussed previously herein, the edges of perforations in shell 20 are embedded in the plastic material of the external molded structure (e.g., structures 53 and 78) extending therethrough, thereby fixedly attaching the external molded structure to shells 20. Such perforation edge embedding attachment means are similar to those described previously herein with regard to internal reinforcing ribs 50 and with reference to FIGS. 8–10.

Optionally, external molded structure 53 (and 78) may be further fixedly attached to elongated shells 20 by means of fasteners (e.g., fastener 125 in FIG. 2) and/or adhesives (e.g., adhesive 128 in FIG. 2) interposed between structure 53 and exterior surfaces 29 of shell 20. Adhesives that may be used include those known to the skilled artisan, such as thermoplastic adhesives and thermosetting adhesives. Typically, an adhesive is applied to portions of exterior surfaces 29 of shell 20 prior to either abutting structure 53 against exterior surfaces 29, or molding the plastic material of structure 53 onto exterior surfaces 29 of shell 20.

In an embodiment of the present invention, external molded structure 53 is further fixedly attached to shell 20 by means of terminal edges of shell 20 (e.g., terminal edges 99 of flange 24) being embedded in the plastic material of external molded structure 53. Such a wrap-around attachment means 7 is depicted in FIG. 15, wherein a portion of the plastic material 126 of external molded structure 53 extends over flange 24 and wraps around and embeds terminal edge 99 therein.

In an embodiment of the present invention, the plastic material embedding terminal edges 99 of flange 24 of shell 20 is continuous with the plastic material of each of internal reinforcing ribs 50 and external molded structure 53. With further reference to wrap-around attachment means 7 of FIG. 15, the plastic material 126 (see also FIG. 1) extending over flange 24 is continuous with the plastic material of both internal reinforcing ribs 50 and external molded structure 53. In addition, terminal edge 99 of flange 24 is embedded in the plastic material 126 that is continuous with internal ribs 50 and external structure 53.

Wrap-around attachment means 7 is preferably formed by molding of plastic material onto flange 24 and terminal edges 99 concurrently with the molding of the plastic material of external molded structure 53 onto exterior surfaces 29 of shell 20. In a preferred embodiment, wrap-around attachment means 7 is formed by concurrently molding the plastic material of internal ribs 50 and external molded structure 53 over edged 99 of flange 24.

In an embodiment of the present invention, the plastic material of reinforcing ribs that extends through at least some of the perforations in the elongated shell is continuous with the plastic material of the external molded structure. Attachment means 8 of FIG. 11 includes internal plastic rib 50, which abuts internal surface 32 of shell 20. A portion of the plastic material of internal rib 50 extends through perforation 45 (see also FIG. 7) and is continuous with rib 56 of external molded structure 53, which abuts external surface 29 of shell 20. Edges 122 of perforation 45 are embedded in the plastic material (of both internal ribs 50 and ribs 56 of external molded structure 53) extending therethrough. Attachment means 8 is preferably formed by concurrently molding the plastic material of ribs 50 onto interior surface 32 of shell 20 and the plastic material of ribs 56 onto exterior surface 29 of shell 20.

The internal reinforcing ribs and/or the external molded structure of the load bearing article of the present invention may be further fixedly attached to the elongated shells by means of protrusions (e.g., bumps or nubs) and/or indentations being present in at least one of the shells. Such a further fixed attachment is achieved by means of the protrusions and/or indentations being embedded in the plastic material of the internal reinforcing ribs and/or the external molded structure.

In FIGS. 5–7, flange 24 of shell 20 has deformations 75 that each include a protrusion and an indentation. The protrusions and indentations of deformations 75 may be embedded in the plastic material of internal reinforcing ribs 50 and/or external molded structure 53 that extends over and around flange 24 (e.g., plastic portions 126 of FIG. 1).

With reference to FIG. 15, deformation 75 of flange 24 has an indentation 151 and a protrusion 154. Protrusion 154 is embedded in the plastic material of external molded structure 53. Indentation 151 is filled with and embedded in plastic material 126, extending over flange 24, that is continuous with the plastic material of external molded structure 53 and internal reinforcing rib 50.

Shell 20 may also include protrusions and/or indentations in sidewalls 22 and/or base 21 (not shown). For purposes of illustration, attachment means 9 of FIG. 12 includes a deformation 134 in shell 20. Deformation 134 has an indentation 137 in exterior surface 29, and a protrusion 140 in interior surface 32 of shell 20. Protrusion 140 is embedded in the plastic material of internal reinforcing rib 50 which also abuts a portion of interior surface 32 of shell 20. Attachment means 9 serves to fixedly attach (or anchor) rib 50 to shell 20. In addition, indentation 137 of deformation 134 may be concurrently embedded in the plastic material of exterior molded structure 53 (not shown).

Attachment means 10 FIG. 13 includes a deformation 143 in shell 20. Deformation 143 includes a protrusion 148 in exterior surface 29, and an indentation 145 in interior surface 32 of shell 20. Indentation 145 is filled with and embedded in the plastic material of internal reinforcing rib 50. Attachment means 10 serves to fixedly attach (or anchor) rib 50 to shell 20. In addition, protrusion 148 may be concurrently embedded in the plastic material of exterior molded structure 53 (not shown).

The load bearing article also includes a load bearing surface that comprises (or is at least defined by) the external molded structure. The load bearing surface is preferably a substantially horizontal load bearing surface. In an embodiment, the load bearing surface comprises (or is defined by) the external molded structure and at least one of: (i) the elongated shells; and (ii) the plurality of internal reinforcing ribs. Load bearing article 1 of FIG. 1 has a load bearing surface 87 that comprises (or is defined by) reinforcing ribs 56 of external molded structure 53, and internal reinforcing ribs 50. Load bearing surface 87 of load bearing article 1 has a plurality of apertures 59 that are defined by reinforcing ribs 56 of external molded structure 53. With reference to FIG. 2, load bearing article 1 has, relative to load bearing surface 87, an opposing surface (or side) 160 thereunder that is defined by the lower portions of ribs 56 and base 21 of each elongated shell 20.

Load bearing article 2 of FIG. 3 has a load bearing surface 157 that is defined by substantially closed surface 84 of external molded structure 78 and base 21 of each elongated shell 20. With reference to FIG. 4, load bearing article 2 has, relative to load bearing surface 157, an opposing surface (or side) 163 that is defined by the under side of substantially closed surface 84 and ribs 81 of external molded structure 78, and internal reinforcing ribs 50.

The load bearing article of the present invention may optionally include a further external molded structure of plastic material. Each further external molded structure is fixedly attached to only one elongated shell. The further external molded structures do not connect the elongated shells to each other. A portion of each further external molded structure abuts a portion of the exterior surfaces of one elongated shell. Each further molded structure is fixedly attached to the shell that it abuts by means of a portion of the plastic material of the further molded structure extending through at least some of the perforations in the shell and the edges of the perforations being embedded in the plastic material extending therethrough.

The further external molded structure may further define and extend the load bearing surface of the load bearing article of the present invention. With reference to FIGS. 1–4, load bearing articles 1 and 2 include further external molded structures 62 each having an upper surface 63. Load bearing surface 87 of article 1 of FIG. 1 is further defined by (in addition to external ribs 56 and internal reinforcing ribs 50) upper surface 63 of further external molded structures 62. Load bearing surface 157 of article 2 of FIG. 3 is further defined by (in addition to substantially closed surface 84 and base 21 of shells 20) upper surface 63 of further external molded structures 62.

Further external molded structure 62 includes a plurality of reinforcing ribs 65 of plastic material. Reinforcing ribs 65 abut exterior surfaces 29 of elongated shells 20.

Each further external molded structure 62 is fixedly attached to an elongated shell 20 by means of plastic material thereof extending through perforations in elongated shells 20, as described previously herein. Such attachment means are similar to the attachment means described previously herein with regard to internal reinforcing ribs 50 and external molded structures 53 and 78. Further external structure 62 may be molded separately from shell 20, and then fixedly attached thereto by means of plastic extensions and or snap fittings being extended through perforations in shell 20, as described previously herein with regard to internal reinforcing ribs 50 and external molded structures 53 and 78.

Preferably, the plastic material of further external structure 62 is molded onto exterior surfaces 29 of shell 20 and a portion of the plastic material thereof flows through some of the perforations in shell 20 embedding the edges of the perforations (which may optionally be deformed) in the plastic material extending therethrough, as described previously herein with regard to internal reinforcing ribs 50 and external molded structures 53 and 78. The molded on plastic material of external structure 62 may also flow through some of perforations 38 of end plates 68 of shells 20 to form attachment heads 94. Preferably, further external molded structure 62 is molded onto exterior surfaces 29 of shell 20 concurrently with the mold formation of internal reinforcing ribs 50 onto interior surfaces 32 and the mold formation of external molded structure 53 (or 78) onto exterior surfaces 29 of shells 20.

Further external molded structure 62 may be further attached to shell 20 by attachment means selected from fasteners and/or adhesives. Terminal edges 99 of shell 20 may be embedded in the plastic material of structure 62, thus further fixedly attaching structure 62 to shell 20. In addition, shell 20 may include indentations and/or protrusions that are embedded in the plastic material of further external molded structure 62, thereby further fixedly attaching structure 62 to shell 20. These means of further attaching structure 62 to shell 20 are similar to those as described previously herein with regard to internal reinforcing ribs 50 and external molded structures 53 and 78.

Internal reinforcing ribs 50, external molded structure 53 and further external molded structure 62 may each be independently fabricated from thermoset materials and/or thermoplastic materials. Thermoset materials from which internal reinforcing ribs 50, external molded structure 53 and further external molded structure 62 may be fabricated include those described previously herein, e.g., crosslinked polyurethanes. In a preferred embodiment of the present invention, the plastic of internal reinforcing ribs 50, external molded structure 53 and further external molded structure 62 is a thermoplastic material selected independently from thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and mixtures or thermoplastic compositions containing one or more thereof. A preferred thermoplastic material from which internal reinforcing ribs 50, external molded structure 53 and further external molded structure 62 may each be fabricated is thermoplastic polyamide, e.g., DURETHAN thermoplastic polyamide, commercially available from Bayer Polymers LLC.

Internal reinforcing ribs 50, external molded structure 53 and further external molded structure 62 may each optionally and independently be reinforced with a material selected from glass fibers, glass beads, carbon fibers, metal flakes, polyamide fibers, nanoparticulate materials (e.g., having average particle sizes in the range of from 1 nm to 1000 nm, such as nanoparticulate clays), talc and mixtures thereof. The reinforcing fibers, as described previously herein, may be surface treated, e.g., with sizings, prior to incorporation into the plastic material of internal reinforcing ribs 50, external molded structure 53 and/or further external molded structure 62. A preferred reinforcing material for use in these plastic elements are glass fibers. If used, the reinforcement material, e.g., glass fibers, is typically present in the thermoset plastic materials and/or thermoplastic materials of internal reinforcing ribs 50, external molded structure 53 and/or further external molded structure 62 in a reinforcing amount, e.g., in an amount of from 5 percent by weight to 60 percent by weight, based on the total weight of the plastic element (e.g., internal reinforcing ribs 50).

The plastic materials of shells 20, internal reinforcing ribs 50, external molded structure 53 and further external molded structure 62 may each independently further contain one or more functional additives other than or in addition to the reinforcing materials. Additives that may be present in the plastic material of the plastic elements of the load bearing article of the present invention include, but are not limited to, antioxidants, colorants, e.g., pigments and/or dyes, mold release agents, fillers (e.g., calcium carbonate and barium sulfate), ultraviolet light absorbers, fire retardants and mixtures thereof. Additives may be present in the plastic material of these plastic elements in functionally sufficient amounts, e.g., in amounts independently from 0.1 percent by weight to 10 percent by weight, based on the total weight of the plastic material of the particular element.

Reversibly extendable load bearing structure 11 of FIGS. 16 and 17 includes a load bearing article 1 that is joined to an adjacent load bearing article 1' by means of a hinge 165. More particularly, the longitudinal end 171 of load bearing article 1 is joined to the longitudinal end 174 of load bearing article 1' by means of hinge 165. Each of load bearing articles 1 and 1' are as described previously herein with reference to FIGS. 1 and 2.

In FIG. 16 reversibly extendable load bearing structure 11 is depicted as being partially extended. In FIG. 17, reversibly extendable load bearing structure 11 is depicted as being fully extended, in which case longitudinal end 171 of load bearing article 1 abuts longitudinal end 174 of load bearing article 1'. When reversibly extendable load bearing structure 11 is fully extended, the load bearing surfaces 87 and 87' of articles 1 and 1' together define an extended load bearing surface 191 (which is preferably a substantially horizontal extended load bearing surface).

Longitudinal end 168 of load bearing article 1 rests on a ledge 180 which is attached to a wall 183. Longitudinal end 168 may be attached to ledge 180 by art recognized means, including for example, one or more hinges (not shown). Alternatively, longitudinal end 168 may simply rest on ledge 180, and be held in place thereon by means of gravity.

When reversibly extendable load bearing structure 11 is fully extended, longitudinal end 177 of load bearing article 1' rests on ledge 185, which is attached to wall 188. Walls 183 and 188, and ledges 180 and 185 are opposed one to the other. When fully extended, longitudinal end 177 may be held in place on ledge 185 by means of, for example, latches (not shown).

In FIGS. 16 and 17, load bearing articles 1 and 1' are oriented along their longitudinal axis 26 and 26', and their longitudinal ends 171 and 174 abut when reversibly extendable structure 11 is fully extended. Alternatively, load bearing article 1 and 1' may be oriented along their latitudinal axis 23 and 23'. In such an alternative embodiment, the latitudinal ends 194 and 197 of load bearing articles 1 and 1' are joined one to the other by means of a hinge (not shown), and latitudinal ends 194 and 197 abut each other when the reversibly extendable load bearing structure is fully extended (not shown).

The load bearing article and the reversibly extendable load bearing structure of the present invention may each be, or may each form part of, an article of manufacture selected independently from, for example: shelves; walk-ways, e.g., elevated walk-ways, such as cat-walks; palettes; and flooring, e.g., elevated flooring over a sump area. The load bearing article and the reversibly extendable load bearing structure of the present invention are particularly useful as or as part of shelves, e.g., shelves used in transportation vehicles, such as delivery trucks.

The present invention has been described with reference to specific details of particular embodiments thereof. It is not intended that such details be regarded as limitations upon the scope of the invention except insofar as and to the extent that they are include in the accompanying claims.

What is claimed is:

1. A load bearing article comprising:
   (a) a plurality of elongated shells residing substantially within a common plane, each of said elongated shells being separated one from the other and having exterior surfaces, interior surfaces which define a hollow interior, and a plurality of perforations having edges;
   (b) a plurality of internal reinforcing ribs of plastic material located within the hollow interior of each elongated shell, a portion of said internal reinforcing ribs being in abutting relationship with the interior surfaces of each elongated shell;
   (c) an external molded structure of plastic material residing between said elongated shells, a portion of said external molded structure being in abutting relationship with at least a portion of the exterior surfaces of said elongated shells; and
   (d) a load bearing surface comprising said external molded structure, wherein, (i) a portion of the plastic material of said internal reinforcing ribs extends through at least some of said perforations of each elongated shell, the edges of said perforations being embedded in the plastic material of said internal reinforcing ribs extending therethrough, thereby attaching fixedly said internal reinforcing ribs to each elongated shell, and (ii) a portion of the plastic material of said external molded structure extends through at least some of said perforations of said elongated shells, the edges of said perforations being embedded in the plastic material of said external molded plastic structure extending therethrough, thereby attaching fixedly said external molded plastic structure to said elongated shells and attaching fixedly said elongated shells to each other.

2. The molded article of claim 1 wherein said elongated shells are substantially parallel with each other.

3. The molded article of claim 1 wherein said external molded structure comprises a plurality of reinforcing ribs of plastic material.

4. The molded article of claim 3 wherein said load bearing surface has apertures that are defined by the plurality of plastic reinforcing ribs of said external molded structure.

5. The molded article of claim 1 wherein at least one of:
(I) said plurality of internal reinforcing ribs forms a continuous unitary structure within the hollow interior of each elongated shell; and
(II) said external molded structure is a continuous unitary structure.

6. The molded article of claim 1 further comprising at least one further external molded structure of plastic material, a portion of each further external molded structure abutting a portion of the exterior surfaces of one elongated shell, a portion of the plastic material of said further external molded structure extends through at least some of said perforations of said elongated shell, the edges of said perforations being embedded in the plastic material of said further external molded plastic structure extending therethrough, thereby attaching fixedly said further external molded plastic structure to said elongated shell.

7. The molded article of claim 6 wherein said further external molded structure comprises a plurality of reinforcing ribs of plastic material.

8. The molded article of claim 1 wherein each elongated shell is independently fabricated from a material selected from metal, thermoset plastic material, thermoplastic material and combinations thereof.

9. The molded article of claim 8 wherein each elongated shell is fabricated from metal.

10. The molded article of claim 1 wherein at least some of said perforations are defined by deformed edge portions, said deformed edge portions being embedded in the plastic material extending therethrough.

11. The molded article of claim 1 wherein the plastic material of said internal reinforcing ribs and said external molded structure are each independently selected from thermoset plastic materials, thermoplastic materials and combinations thereof.

12. The molded article of claim 11 wherein the plastic material of said internal reinforcing ribs and said external molded structure is a thermoplastic material selected independently from thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and thermoplastic compositions containing one or more thereof.

13. The molded article of claim 12 wherein the plastic material of at least one of said internal reinforcing ribs and said external molded structure is reinforced with a material selected from glass fibers, glass beads, carbon fibers, metal flakes, polyamide fibers, nanoparticulate clays, talc and mixtures thereof.

14. The molded article of claim 1 wherein at least one of said elongated shells has at least one of a plurality of protrusions and a plurality of indentations, at least some of at least one of said protrusions and said indentations being embedded in the plastic material of at least one of said internal reinforcing ribs and said external molded structure, thereby further fixedly attaching at least one of said internal reinforcing ribs and said external molded structure to said elongated shell.

15. The molded article of claim 1 wherein at least one of said internal reinforcing ribs and said external molded structure is further fixedly attached to at least one elongated shell by attachment means selected from fasteners, adhesives and combinations thereof.

16. The molded article of claim 1 wherein at least one of said elongated shells has terminal edges, at least a portion of said terminal edges being embedded in the plastic material of at least one of said internal reinforcing ribs and said external molded structure, thereby further fixedly attaching at least one of said internal reinforcing ribs and said external molded structure to said elongated shell.

17. The molded article of claim 16 wherein the plastic material embedding said terminal edges therein is continuous with the plastic material of each of said internal reinforcing ribs and said external molded structure.

18. The molded article of claim 1 wherein the plastic material of said internal reinforcing ribs extending through at least some of said perforations is continuous with the plastic material of said external molded structure.

19. The molded article of claim 1 wherein each elongated shell is a substantially U-shaped elongated shell.

20. The molded article of claim 1 wherein at least one of:
(I) said internal reinforcing ribs are formed by molding of plastic material onto the interior surfaces of said elongated shell, and a portion of the plastic material of said internal reinforcing ribs extends through at least some of said perforations of said elongated shell, the edges of said perforations being embedded in the plastic material extending therethrough, thereby attaching fixedly said reinforcing ribs to said elongated shell; and
(II) said external molded structure is formed by molding of plastic material onto the exterior surfaces of said elongated shells, and a portion of the plastic material of said external molded structure extends through at least some of said perforations of said elongated shells, the edges of said perforations being embedded in the plastic material extending therethrough, thereby attaching fixedly said external molded structure to said elongated shells.

21. The molded article of claim 20 wherein each of said internal reinforcing ribs and said external molded structure are formed by concurrently molding plastic material onto the interior and exterior surfaces of said elongated shells.

22. The molded article of claim 21 wherein
at least one of said elongated shells has at least one of a plurality of protrusions and a plurality of indentations, at least some of at least one of said protrusions and said indentations being embedded in the plastic material of at least one of said internal reinforcing ribs and said external molded structure, thereby further fixedly attaching at least one of said internal reinforcing ribs and said external molded structure to said elongated shell, and
at least one of said elongated shells has terminal edges, at least a portion of said terminal edges being embedded in the plastic material of at least one of said internal reinforcing ribs and said external molded structure, thereby further fixedly attaching at least one of said internal reinforcing ribs and said external molded structure to said elongated shell.

23. The molded article of claim 22 wherein the plastic material embedding said terminal edges therein is continuous with the plastic material of each of said internal reinforcing ribs and said external molded structure.

24. The molded article of claim 23 wherein the plastic material of said internal reinforcing ribs extending through at least some of said perforations is continuous with the plastic material of said external molded structure.

25. The load bearing article of claim 1 wherein said load bearing article is selected from shelves, walk-ways, palettes and flooring.

26. The load bearing article of claim 1 wherein said load bearing surface comprises said external molded structure and at least one of: said plurality of elongated shells; and said plurality of internal reinforcing ribs.

27. A reversibly extendable load bearing structure comprising at least two load bearing articles, each load bearing article being joined to at least one adjacent load bearing article by means of a hinge, each load bearing article having an end that abuts an end of each adjacent load bearing article when said reversibly extendable load bearing structure is fully extended, wherein each of said load bearing articles comprises:
(a) a plurality of elongated shells residing substantially within a common plane, each of said elongated shells being separated one from the other and having exterior surfaces, interior surfaces which define a hollow interior, and a plurality of perforations having edges;
(b) a plurality of internal reinforcing ribs of plastic material located within the hollow interior of each elongated shell, a portion of said internal reinforcing ribs being in abutting relationship with the interior surfaces of each elongated shell;
(c) an external molded structure of plastic material residing between said elongated shells, a portion of said external molded structure being in abutting relationship with at least a portion of the exterior surfaces of said elongated shells; and
(d) a load bearing surface comprising said external molded structure, further wherein, (i) a portion of the plastic material of said internal reinforcing ribs extends through at least some of said perforations of each elongated shell, the edges of said perforations being embedded in the plastic material of said internal reinforcing ribs extending therethrough, thereby attaching fixedly said internal reinforcing ribs to each elongated shell, and (ii) a portion of the plastic material of said external molded structure extends through at least some of said perforations of said elongated shells, the edges of said perforations being embedded in the plastic material of said external molded plastic structure extending therethrough, thereby attaching fixedly said external molded plastic structure to said elongated shells and attaching fixedly said elongated shells to each other.

28. The reversibly extendable load bearing structure of claim 27 wherein the load bearing surface of each load bearing article together defines an extended load bearing surface when said reversibly extendable load bearing structure is fully extended.

29. The reversibly extendable load bearing structure of claim 27 wherein each load bearing article has a longitudinal axis and a longitudinal end that abuts a longitudinal end of each adjacent load bearing article when said reversibly extendable load bearing structure is fully extended.

30. The reversibly extendable load bearing structure of claim 27 wherein each load bearing article has a latitudinal axis and a latitudinal end that abuts a latitudinal end of each adjacent load bearing article when said reversibly extendable load bearing structure is fully extended.

* * * * *